(12) United States Patent
Goren et al.

(10) Patent No.: US 9,361,502 B2
(45) Date of Patent: Jun. 7, 2016

(54) SYSTEM FOR, AND METHOD OF, CONTROLLING TARGET ILLUMINATION FOR AN IMAGING READER

(71) Applicant: SYMBOL TECHNOLOGIES, INC., Schaumburg, IL (US)

(72) Inventors: David P Goren, Smithtown, NY (US); Vladimir Gurevich, Stony Brook, NY (US); Anatoly A Kotlarsky, Churchville, PA (US); Faisal Qureshi, Seattle, WA (US)

(73) Assignee: Symbol Technologies, LLC, Holtsville, NY (US)

( * ) Notice: Subject to any disclaimer, the term of this patent is extended or adjusted under 35 U.S.C. 154(b) by 0 days.

(21) Appl. No.: 14/448,554

(22) Filed: Jul. 31, 2014

(65) Prior Publication Data

US 2016/0034737 A1     Feb. 4, 2016

(51) Int. Cl.
*G06K 7/10*     (2006.01)
*G06K 7/14*     (2006.01)
*H04N 5/235*   (2006.01)

(52) U.S. Cl.
CPC ............ *G06K 7/146* (2013.01); *G06K 7/10881* (2013.01); *H04N 5/2354* (2013.01); *G06K 2007/10524* (2013.01)

(58) Field of Classification Search
CPC . G06K 7/10851; G06K 7/10722; G06K 7/14; G06K 7/10811; G06K 7/10881; G06K 7/10702; G06K 7/10584; G06K 7/10732
USPC ............ 235/462.06, 462.11, 462.22, 462.23, 235/462.26, 462.41, 462.42, 455
See application file for complete search history.

(56) References Cited

U.S. PATENT DOCUMENTS

| | | | |
|---|---|---|---|
| 7,227,117 B1 | 6/2007 | Lackemann et al. | |
| 7,303,126 B2 | 12/2007 | Patel et al. | |
| 7,327,393 B2 | 2/2008 | Ying et al. | |
| 7,567,691 B2 | 7/2009 | Shigeta | |
| 8,130,313 B2 | 3/2012 | Velarde et al. | |
| 8,336,778 B2 | 12/2012 | Powell et al. | |
| 2002/0179713 A1 | 12/2002 | Pettinelli et al. | |
| 2007/0284447 A1 | 12/2007 | McQueen | |
| 2010/0110215 A1* | 5/2010 | Akita et al. | 348/222.1 |
| 2012/0105639 A1 | 5/2012 | Stein et al. | |
| 2012/0305748 A1 | 12/2012 | Spears | |
| 2013/0002613 A1 | 1/2013 | Keam | |

FOREIGN PATENT DOCUMENTS

EP     0602637     6/1994
JP     2012195677  10/2012

OTHER PUBLICATIONS

International Search Report and Written Opinion, mailed Jan. 7, 2016, in counterpart PCT application PCT/US2015/040743.

\* cited by examiner

*Primary Examiner* — Karl D Frech

(57) ABSTRACT

An imaging reader has an illuminating light assembly for illuminating a target with illumination light, and a solid-state image sensor with a rolling shutter for sequentially exposing an array of pixels to capture an image from the illuminated target. Target illumination is controlled by controlling an exposure time and a gain of the sensor, and by controlling an output power of the illumination light. The output power is maintained at a maximum level when the exposure time and/ or the gain exceed a minimum threshold, and is lowered when the exposure time and/or the gain does not exceed the minimum threshold, while concomitantly maintaining the exposure time and/or the gain constant at the minimum threshold.

12 Claims, 6 Drawing Sheets

SYSTEM FOR, AND METHOD OF, CONTROLLING TARGET ILLUMINATION FOR AN IMAGING READER

BACKGROUND OF THE INVENTION

The present invention relates generally to a system for, and a method of, controlling target illumination for an imaging reader that reads targets by image capture.

Solid-state imaging systems or imaging readers have been used, in both handheld and/or hands-free modes of operation, to electro-optically read targets, such as one- and two-dimensional bar code symbols, and/or non-symbols, such as documents, over a range of working distances relative to a light-transmissive window provided on a housing of each reader. The housing supports an imaging module, also known as a scan engine, that includes an imaging assembly having a solid-state imager or imaging sensor with an array of photocells or pixels, which correspond to image elements or pixels in an imaging field of view of the sensor, and an imaging lens assembly for capturing return light scattered and/or reflected from the target being imaged, and for projecting the return light onto the sensor to initiate capture of an image of each target. Such a sensor may include a one- or two-dimensional charge coupled device (CCD) or a complementary metal oxide semiconductor (CMOS) device, with global or rolling exposure shutters, and associated circuits for producing and processing electrical signals corresponding to a one- or two-dimensional array of pixel data over the imaging field of view. In order to increase the amount of the return light captured by the sensor, for example, in dimly lit environments or for far-out targets located relatively far from the window, the imaging module generally also includes an illuminating light assembly for illuminating the target with illumination light over an illumination field for reflection and scattering from the target. The return light captured by the sensor includes the returning illumination light and any ambient light in the vicinity of the reader.

To achieve a desired image brightness, also known as a white level, for the captured image, it is known to use an automatic exposure controller (AEC) to control the sensor's exposure time, and to use an automatic gain controller (AGC) to control the sensor's gain. The AEC and the AGC are, in turn, controlled by a main controller or microprocessor. Increasing the exposure time and/or the gain will increase the captured image brightness. A typical known strategy is to use exposure priority, in which the exposure time is increased first until a maximum exposure time or threshold (typically around 4-8 ms in order to reduce hand-jitter effects for a handheld reader) is reached. If the image brightness is still too low as determined by the main controller, then the gain is increased. This strategy maximizes the signal-to-noise ratio (SNR) of the sensor, because the gain is only increased when necessary.

The amount of the illumination light delivered to, and returned from, the target by the illuminating light assembly is another factor that contributes to the captured image brightness. The greater the intensity or output power of the illumination light, the brighter is the captured image. It is known to maintain the illumination power supplied by the illuminating light assembly at a maximum constant level or threshold during the AEC/AGC process.

When using a global shutter sensor where all the pixels are exposed at the same time, the illuminating light assembly only needs to be turned on to illuminate the target during the exposure time. This results in a very efficient use of the illumination light since the illuminating light assembly is turned off when not needed during non-exposure times. As the exposure time decreases, the less illumination light power is used. However, when using a lower cost, rolling shutter sensor where the pixels are sequentially exposed at different times, the illuminating light assembly must be turned on throughout the time of an entire frame, regardless of the exposure time, in order to illuminate and capture the entire target image. A typical exposure time is much shorter than the frame time (e.g., for a sensor operating at 30 frames per second, the maximum exposure time could be about 4 ms, while the frame time is 1/30 sec=33.3 ms). This results in a very inefficient use of the illuminating light assembly, especially for sensors having short exposure times and long frames. The additional electrical energy consumed during generation of the illumination light not only generates undesirable heat, but also undesirably drains an on-board battery typically provided in handheld, wireless imaging readers, thereby requiring more frequent recharging, more downtime, and shorter working lifetimes. Also, the illumination light, especially when very bright, is generally regarded as an annoyance to operators and any people in the vicinity of the reader. Reducing such high illumination annoyance would be desirable for everyone's comfort.

Accordingly, there is a need to more efficiently control target illumination in real-time to reduce illumination power, conserve electrical energy, reduce generated excess waste heat, and not annoy operators and others, in the operation of imaging readers having rolling shutter sensors, with a minimum impact on reading performance.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
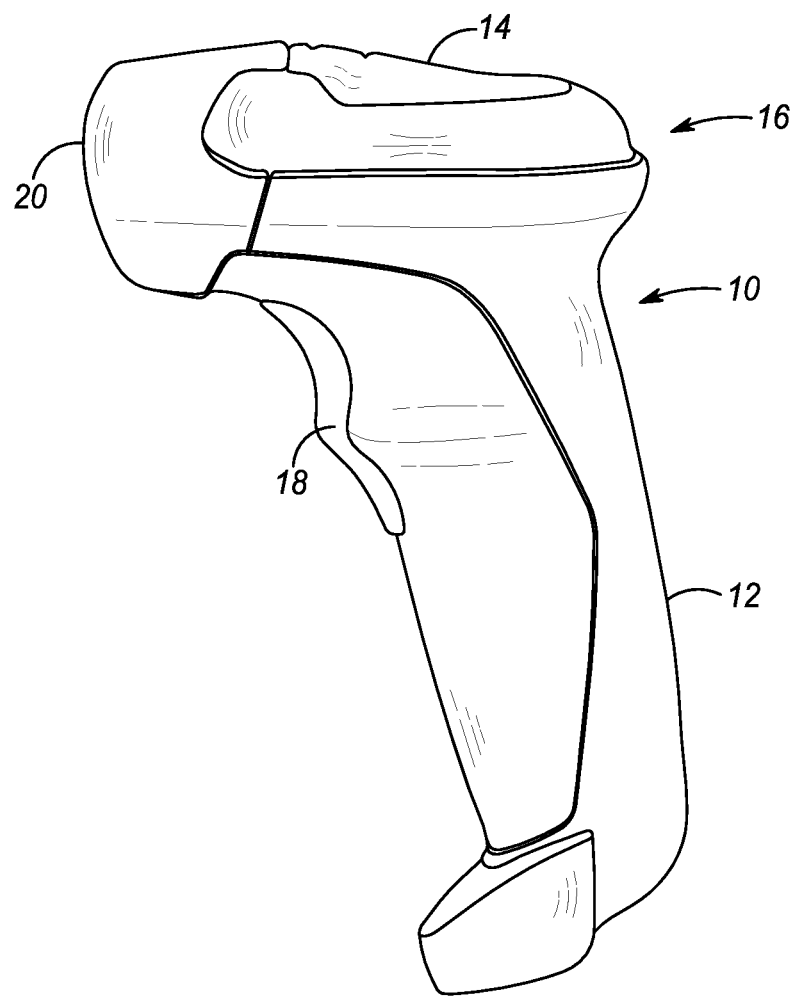
FIG. 1 is a view of a handheld imaging reader whose target illumination is to be controlled in accordance with the present invention.

Skilled artisans will appreciate that elements in the figures are illustrated for simplicity and clarity and have not necessarily been drawn to scale. For example, the dimensions and locations of some of the elements in the figures may be exaggerated relative to other elements to help to improve understanding of embodiments of the present invention.

The system and method components have been represented where appropriate by conventional symbols in the drawings, showing only those specific details that are pertinent to understanding the embodiments of the present inven-

DETAILED DESCRIPTION OF THE INVENTION

One aspect of the present disclosure relates to a control system for an imaging reader having an illuminating light assembly for illuminating a target with illumination light, and a solid-state image sensor, e.g., a charge coupled device (CCD) or a complementary metal oxide semiconductor (CMOS) device, with a rolling shutter for sequentially exposing an array of pixels to capture an image from the illuminated target. The control system comprises an exposure controller for controlling an exposure time of the sensor; a gain controller for controlling a gain of the sensor; and an illumination controller for controlling an output power of the illumination light. The control system further comprises a main controller operatively connected to the exposure, gain and illumination controllers, for maintaining the output power at a maximum level when the exposure time and/or the gain exceed a minimum threshold, and for lowering the output power of the illumination light when the exposure time and/or the gain do not exceed the minimum threshold, while concomitantly maintaining the exposure time and/or the gain constant at the minimum threshold.

Another aspect of the present disclosure relates to a method of controlling an imaging reader having an illuminating light assembly for illuminating a target with illumination light, and a solid-state image sensor with a rolling shutter for sequentially exposing an array of pixels to capture an image from the illuminated target. The method is performed by controlling an exposure time of the sensor, by controlling a gain of the sensor, by controlling an output power of the illumination light, by maintaining the output power at a maximum level when the exposure time and/or the gain exceed a minimum threshold, and by lowering the output power of the illumination light when the exposure time and/or the gain do not exceed the minimum threshold, while concomitantly maintaining the exposure time and/or the gain constant at the minimum threshold.

The lowered output power renders the operation of the illuminating light assembly to be more efficient, especially for rolling shutter sensors having short exposure times and long frames. Less electrical energy is consumed as compared to the prior art during generation of the illumination light. On-board battery drain is reduced, thereby requiring less frequent recharging, less downtime, and longer working lifetimes. Less waste heat is generated. Users are less annoyed since the illumination light intensity has been lowered.

Reference numeral 10 in FIG. 1 generally identifies a mobile, handheld reader for electro-optically reading targets by image capture. As illustrated, the imaging reader 10 has a lower handle 12 to be gripped in a user's hand, and an upper barrel 14 arranged in a gun-shaped housing 16 having a trigger 18 that is manually depressed by the user's forefinger to initiate reading of a target, such as a one- or two-dimensional bar code symbol associated with a product. A light-transmissive window 20 (best seen in FIG. 2) is mounted on the housing 16 at the front end region of the barrel 14. The reader 10 can thus be used in a handheld mode in which the reader 10 is aimed at each target to be read, followed by manual depression of the trigger 18 to initiate reading.

Figure 2:
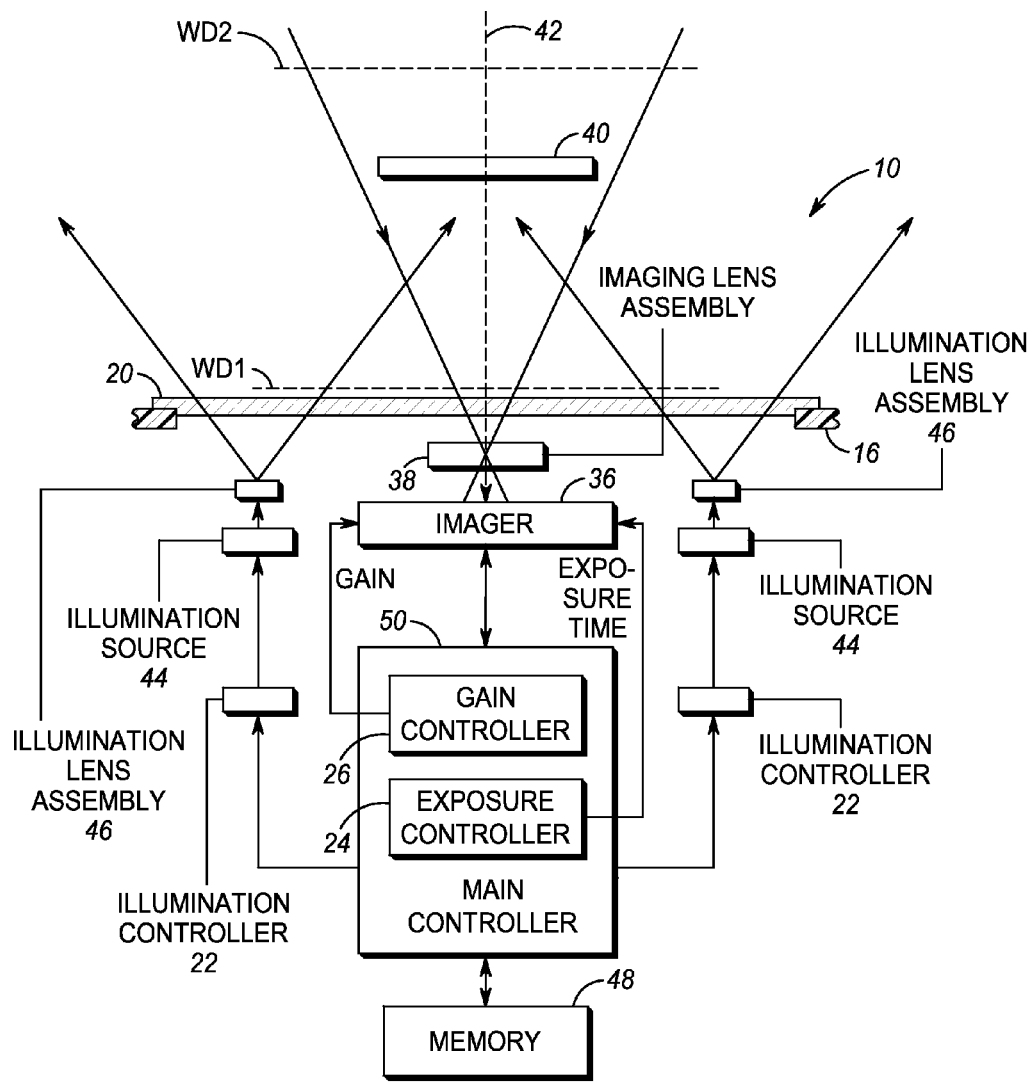
FIG. 2 is a diagrammatic view depicting system components of the reader of FIG. 1.

FIG. 2 schematically depicts an imaging module or scan engine mounted in the reader 10 behind the window 20. The imaging module includes a solid-state, imager or image sensor 36, and an imaging lens assembly 38, which may have one or more imaging lenses, such as a Cooke triplet. The sensor 36 has an array of pixels or photocells and may be a one- or two-dimensional charge coupled device (CCD) or a complementary metal oxide semiconductor (CMOS) device, preferably having a rolling exposure shutter, and is analogous to the sensors used in electronic digital cameras. The rolling shutter sequentially exposes the pixels that are typically arranged in mutually orthogonal rows and columns. The sensor 36 and the lens assembly 38 are together operative for capturing return light scattered and/or reflected from a target 40 to be read by image capture over a field of view along an optical path or axis 42 through the window 20 and over a range of working distances between a close-in working distance (WD1) and a far-out working distance (WD2). In a preferred embodiment, WD1 is either at, or about a half inch away from, the window 20, and WD2 can be two feet and more from the window 20, although other numerical values are contemplated. The target 40 may either be a printed code associated with a product, or an electronic code displayed on a mobile electronic device, such as a smartphone.

The reader 10 also supports an energizable illuminating light assembly for illuminating the target 40 with illumination light from an illumination light source when energized. The illuminating light assembly includes, as illustrated, a pair of illumination light sources or light emitting diodes (LEDs) 44, and a corresponding pair of illumination lens assemblies 46 to uniformly illuminate the target 40 with illumination light when energized. The illumination LEDs 44 and the illumination lens assemblies 46 are preferably symmetrically located at opposite sides of the sensor 36.

A main controller or microprocessor 50 controls operation of the electrical components of the assemblies, processes the captured return light from the target 40 as an image, and decodes the captured image. A memory 48 is connected, and accessible, to the main controller 50. The main controller 50 includes an electrical current driver or illumination controller 22 for each LED 44, an exposure controller 24 for controlling the exposure time of the sensor 36, and a gain controller 26 for controlling the gain of the sensor 36. The exposure and gain controllers 24, 26 are preferably software-based and integrated with the main controller 50, but they could also be hardware-based. Each illumination controller 22 is preferably hardware-based, but could also be software-based.

As previously mentioned, increasing the exposure time and/or the gain and/or the output power of the illumination light will increase the captured image brightness. This invention is concerned with controlling one or more of these factors in an imaging reader having a rolling shutter with the goal of more efficiently utilizing the illuminating light assembly, conserving electrical power, reducing waste heat, reducing battery drain, and avoiding very bright annoying illumination light.

Figure 3:
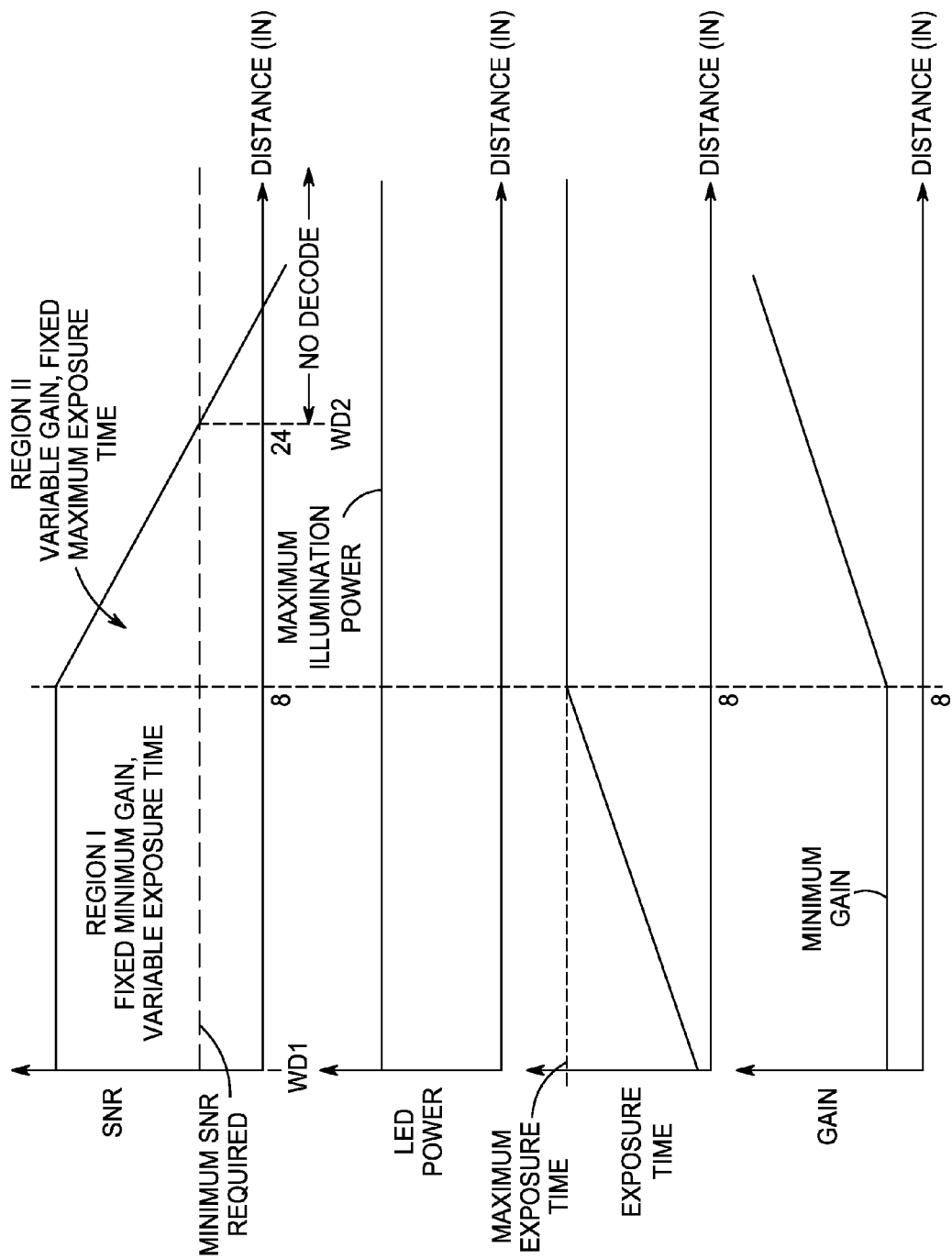
FIG. 3 is a set of graphs depicting how the signal-to-noise ratio, the illumination power, the exposure time and the gain are controlled as a function of working distance in a reader of the type shown in FIG. 1 in accordance with the prior art where ambient light is not dominant over illumination light.

Turning to the prior art depicted in FIG. 3, the signal-to-noise ratio (SNR), the LED illumination power, the exposure time and the gain are plotted as a function of distance away from the window 20 from WD1 to and past WD2. A typical strategy in accordance with this prior art is to use exposure priority, in which the exposure time is increased to achieve a desired image brightness, first in Region I until a maximum exposure time threshold (typically around 4-8 ms in order to reduce hand-jitter effects for a handheld reader) is reached, and concomitantly, the gain is maintained at a constant minimum gain threshold level in Region I. If the image brightness is still too low as determined by the main controller 50, then the gain is increased in Region II, while the exposure time is maintained at its maximum threshold value. This strategy maximizes the SNR of the sensor 36, because the gain is only increased when necessary. The illumination power supplied by the illuminating light assembly is maintained at a maximum constant power threshold level in both Regions I and II. As shown, Region I generally encompasses a range of near distances starting from the window 20 and ending at about 8 inches from the window 20, and Region II encompasses a range of far distances starting from about 8 inches from the window 20 and ending at about 24 inches from the window 20, after which the SNR is too low to obtain meaningful data. In FIG. 3, it is assumed that ambient light does not substantially affect the illumination light, i.e., there is no sunlight or overly bright lights in the vicinity of the reader 10 whose intensity impacts that of the illumination light.

Figure 4:
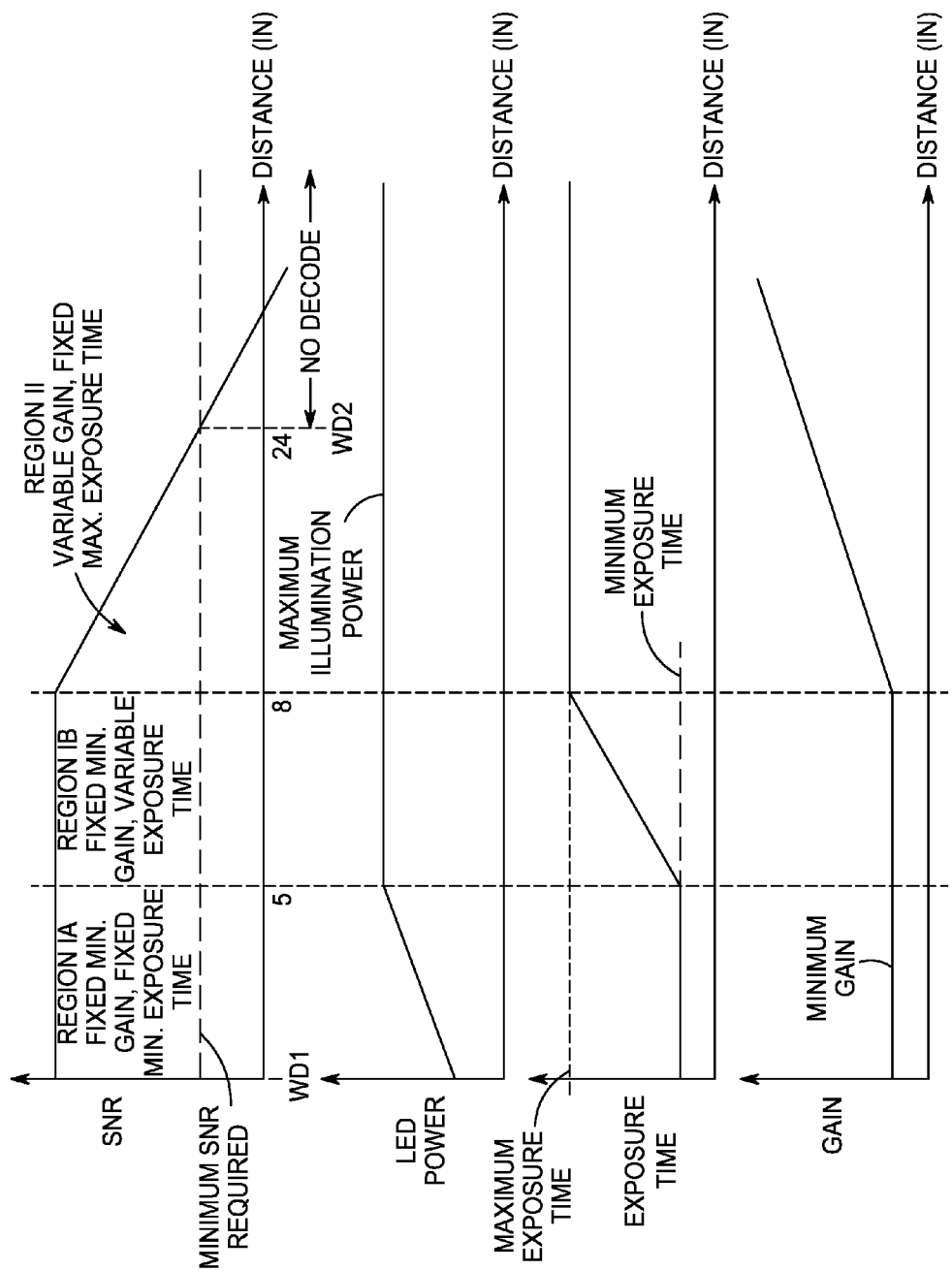
FIG. 4 is a set of graphs analogous to those of FIG. 3 in accordance with one aspect of this invention.

Turning to one aspect of the invention as depicted in FIG. 4, the SNR, the LED illumination power, the exposure time and the gain are again plotted as a function of distance away from the window 20 from WD1 to and past WD2. To reduce illumination power when using a rolling shutter sensor 36, the illumination power is modulated in real-time as a function of exposure time. When the exposure time is long (e.g., close to the maximum exposure time threshold), the illumination light is directed at full output power to the target to maximize the SNR. If the exposure time becomes smaller than a predetermined threshold value, i.e., a minimum exposure time threshold, where hand jitter effects are no longer an issue (e.g., about 1 ms), then the illumination power level is lowered, instead of reducing the exposure time (as in the prior art) to achieve the desired target brightness level.

More particularly, the aforementioned Region I has been subdivided into Regions 1A and 1B in FIG. 4. Region 1A generally encompasses a range of near distances starting from the window 20 and ending at about 5 inches from the window 20, and Region IB encompasses a range of intermediate distances starting from about 5 inches from the window 20 and ending at about 8 inches from the window 20. Region II is as described above. As before, the exposure time is increased to achieve a desired image brightness in Region IB until a maximum exposure time threshold (typically around 4-8 ms in order to reduce hand jitter effects for a handheld reader) is reached, and concomitantly, the gain is maintained at a constant minimum gain threshold level in Region IB. If the image brightness is still too low as determined by the main controller 50, then the gain is increased in Region II, while the exposure time is maintained at its maximum threshold value. The illumination power supplied by the illuminating light assembly is maintained at a maximum constant power threshold level in both Regions IB and II.

However, in contrast to the strategy depicted in FIG. 3, the illumination power is lowered to achieve a desired image brightness in Region IA in the direction toward the window 20, and concomitantly, the exposure time is maintained constant at the aforementioned minimum exposure time threshold, and the gain is maintained constant at the aforementioned minimum gain level threshold. Thus, in FIG. 4, the exposure time is kept constant and the illumination is modulated in the range of working distances closest to the window, whereas, in the prior art, the illumination is kept constant and the exposure time is modulated in the range of working distances closest to the window. It is this reduction in the illumination light power that is responsible for rendering the operation of the illuminating light assembly to be more efficient, and to consume less electrical energy, and to reduce on-board battery drain, and to generate less waste heat, and to annoy users less.

In FIG. 4, as in FIG. 3, it is assumed that ambient light does not substantially affect the illumination light. This is typically the case in an indoor environment. If ambient light has a high intensity (e.g., sunlight, an outdoor environment, or extremely bright indoor lamps), then reducing the illumination light while keeping the exposure time fixed at the minimum gain level threshold (Region IA) will have little effect on the target brightness. This situation can be detected by monitoring the target brightness as the illumination light is reduced. The amount of ambient light versus illumination light can also be determined from measurements with and without the illumination light enabled, or with measurements taken at two different illumination light levels. In addition, an external photodiode can be operated to measure the ambient light level.

Figure 5:
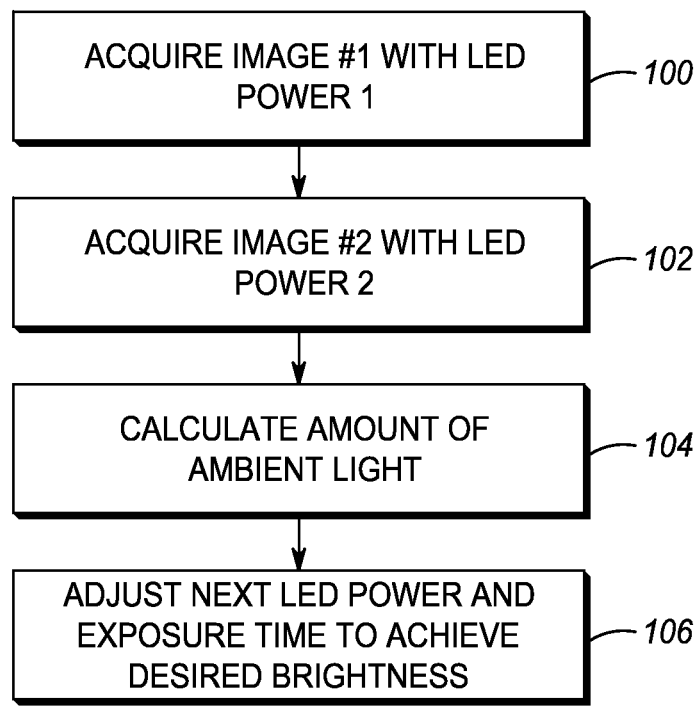
FIG. 5 is a flow chart depicting steps performed in detecting the level of ambient light.
Figure 6:
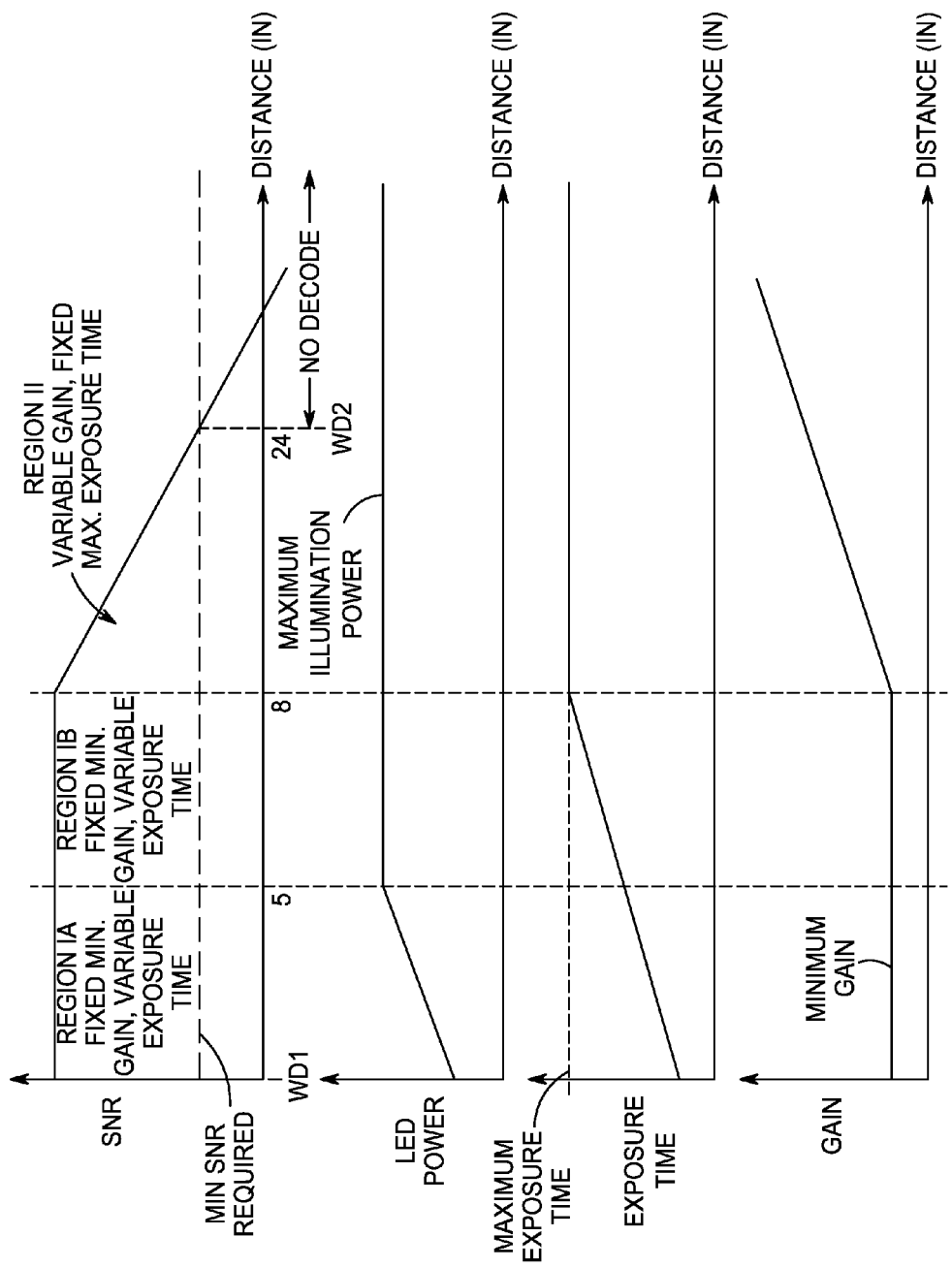
FIG. 6 is a set of graphs analogous to those of FIG. 4 in accordance with another aspect of this invention where ambient light is dominant over illumination light.

For example, as shown in the flow chart of FIG. 5, in step 100, the sensor 36 captures a first target image at a first illumination power level set by the main controller 50, and the main controller 50 determines a first brightness level of the first target image. In step 102, the sensor 36 captures a second target image at a second illumination power level set by the main controller 50, and the main controller 50 determines a second brightness level of the second target image. If the second power level is, for example, half of the first power level, then the second brightness level would be expected to half of the first brightness level. If it is not, then the main controller 50 can calculate the level of the ambient light, as well as the level of the illumination light, and determine whether or not the ambient light has substantially affected the illumination light, in step 104. If it is determined that the ambient light has substantially affected the illumination light, then both the illumination power and the exposure time will be reduced to achieve the target brightness in step 106. This control is depicted in FIG. 6, in which both the illumination power and the exposure time are simultaneously reduced to achieve a desired image brightness in Region IA in the direction toward the window 20.

In the foregoing specification, specific embodiments have been described. However, one of ordinary skill in the art appreciates that various modifications and changes can be made without departing from the scope of the invention as set forth in the claims below. For example, rather than modulating the exposure time and maintaining the gain at a minimum gain level threshold in Region 1B in FIGS. 4 and 6, this invention also proposes the inverse, i.e., modulating the gain and maintaining the exposure time at a minimum exposure time level threshold in Region 1B in FIGS. 4 and 6. This scenario may advantageously be employed when the SNR is not a determining factor. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or apparatus that comprises, has, includes, contains a list of elements does not include only those elements, but may include other elements not expressly listed or inherent to such process, method, article, or apparatus. An element proceeded by "comprises . . . a," "has . . . a," "includes . . . a," or "contains . . . a," does not, without more constraints, preclude the existence of additional identical elements in the process, method, article, or apparatus that comprises, has, includes, or contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the term is defined to be within 10%, in another embodiment within 5%, in another embodiment within 1%, and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors, and field programmable gate arrays (FPGAs), and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein, will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

The invention claimed is:

1. A control system for an imaging reader having an illuminating light assembly for illuminating a target with illumination light, and a solid-state image sensor with a rolling shutter for sequentially exposing an array of pixels to capture an image from the illuminated target, the control system comprising:
   an exposure controller for controlling an exposure time of the sensor;
   a gain controller for controlling a gain of the sensor;
   an illumination controller for controlling an output power of the illumination light; and
   a main controller operatively connected to the exposure, gain and illumination controllers, for maintaining the output power at a maximum level when at least one of the exposure time and the gain exceeds a minimum threshold, and for lowering the output power of the illumination light when the at least one of the exposure time and the gain does not exceed the minimum threshold, while concomitantly maintaining the at least one of the exposure time and the gain constant at the minimum threshold.

2. The system of claim 1, wherein the reader has a light-transmissive window relative to which the target is located in a range of working distances; and wherein the main controller lowers the output power by decreasing the output power in a direction towards the window to achieve a desired image brightness, when the at least one of the exposure time and the gain does not exceed the minimum threshold.

3. The system of claim 2, wherein the main controller maintains the output power at the maximum level when the exposure time exceeds a minimum exposure time threshold, and lowers the output power of the illumination light when the exposure time does not exceed the minimum exposure time threshold, while concomitantly maintaining the exposure time constant at the minimum exposure time threshold.

4. The system of claim 3, wherein the main controller maintains the exposure time at the minimum exposure time threshold and also maintains the gain at a minimum gain threshold, when lowering the output power.

5. The system of claim 1, wherein the main controller inversely controls the exposure time and the gain, when maintaining the output power at the maximum level.

6. The system of claim 1, wherein the main controller and the sensor are operative for determining whether ambient light substantially affects the illumination light, and wherein the main controller is operative for lowering the output power of the illumination light, and for concomitantly lowering the at least one of the exposure time and the gain, when the ambient light substantially affects the illumination light.

7. A method of controlling an imaging reader having an illuminating light assembly for illuminating a target with illumination light, and a solid-state image sensor with a rolling shutter for sequentially exposing an array of pixels to capture an image from the illuminated target, the method comprising:
   controlling an exposure time of the sensor;
   controlling a gain of the sensor;
   controlling an output power of the illumination light;
   maintaining the output power at a maximum level when at least one of the exposure time and the gain exceeds a minimum threshold; and
   lowering the output power of the illumination light when the at least one of the exposure time and the gain does not exceed the minimum threshold, while concomitantly maintaining the at least one of the exposure time and the gain constant at the minimum threshold.

8. The method of claim 7, wherein the reader has a light-transmissive window relative to which the target is located in a range of working distances; and wherein the lowering of the output power is performed by decreasing the output power in a direction towards the window to achieve a desired image brightness, when the at least one of the exposure time and the gain does not exceed the minimum threshold.

9. The method of claim 8, and maintaining the output power at the maximum level when the exposure time exceeds a minimum exposure time threshold, and lowering the output power of the illumination light when the exposure time does not exceed the minimum exposure time threshold, while concomitantly maintaining the exposure time constant at the minimum exposure time threshold.

10. The method of claim 9, and maintaining the exposure time at the minimum exposure time threshold and also maintaining the gain at a minimum gain threshold, when lowering the output power.

11. The method of claim 10, and inversely controlling the exposure time and the gain, when maintaining the output power at the maximum level.

12. The method of claim 7, and determining whether ambient light substantially affects the illumination light, and lowering the output power of the illumination light, and concomitantly lowering the at least one of the exposure time and the gain, when the ambient light substantially affects the illumination light.

* * * * *